(12) United States Patent
Choy et al.

(10) Patent No.: US 8,962,185 B2
(45) Date of Patent: *Feb. 24, 2015

(54) CATHODE MIX HAVING IMPROVED EFFICIENCY AND ENERGY DENSITY OF ELECTRODE

(75) Inventors: Sanghoon Choy, Daejeon (KR); Yong Tae Lee, Jeonju-Si (KR); Hong-Kyu Park, Daejeon (KR); Soo Min Park, Daejeon (KR); Hyo-Shik Kil, Daejeon (KR); Cheol-Hee Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 311 days.

This patent is subject to a terminal disclaimer.

(21) Appl. No.: 12/709,011

(22) Filed: Feb. 19, 2010

(65) Prior Publication Data

US 2010/0239909 A1    Sep. 23, 2010

Related U.S. Application Data

(63) Continuation of application No. PCT/KR2009/006082, filed on Oct. 21, 2009.

(30) Foreign Application Priority Data

Oct. 22, 2008    (KR) .................. 10-2008-0103553

(51) Int. Cl.
*H01M 4/52*    (2010.01)
*H01M 4/58*    (2010.01)
(Continued)

(52) U.S. Cl.
CPC ............. *H01M 4/5825* (2013.01); *C01B 25/37* (2013.01); *H01M 4/136* (2013.01); *H01M 10/052* (2013.01); *H01M 2006/5094* (2013.01)
USPC ........ 429/221; 429/60; 429/218.1; 252/182.1

(58) Field of Classification Search
USPC ................. 429/60, 218.1, 221; 252/182.1
See application file for complete search history.

(56) References Cited

U.S. PATENT DOCUMENTS

2006/0134527 A1*  6/2006  Amine et al. ................ 429/326
2006/0188782 A1*  8/2006  Yamada et al. .......... 429/231.95

(Continued)

FOREIGN PATENT DOCUMENTS

KR    10-2006-0132576 A    12/2006
KR    10-2008-0024597 A    3/2008

(Continued)

OTHER PUBLICATIONS

Handbook of Chemistry & Physics, 94th Online Edition, Section 12, Property of Solids, pp. 187-204 titled "Phase Diagrams," accessed Aug. 27, 2013, http://www.hbcpnetbase.com/.*

*Primary Examiner* — Ula C. Ruddock
*Assistant Examiner* — Amanda Barrow
(74) *Attorney, Agent, or Firm* — Birch, Stewart, Kolasch & Birch, LLP

(57) ABSTRACT

Provided is a cathode mix for lithium secondary batteries, comprising a cathode active material having a composition represented by the following Formula I: $LiFe(P_{1-x}O_4)$ (I) wherein a molar fraction (1–x) of phosphorus (P) is in the range of 0.910 to 0.999, to allow operational efficiency of the cathode active material to be leveled to a lower operational efficiency of an anode active material and improve energy density of the cathode active material.

The cathode mix maximizes operational efficiency of batteries, minimizes electrode waste and thus reduces manufacturing costs of batteries. Furthermore, The cathode active material, wherein a molar fraction (1–x) of phosphorus (P) is lower than 1, according to the present invention contains both $Fe^{2+}$ and $Fe^{3+}$, thus advantageously causing no structural deformation, improving ionic conductivity, exhibiting superior rate properties, inhibiting IR drop upon charge/discharge, thereby imparting high energy density to batteries.

9 Claims, 3 Drawing Sheets

(51) Int. Cl.
*C01B 25/37* (2006.01)
*H01M 4/136* (2010.01)
*H01M 10/052* (2010.01)
*H01M 6/50* (2006.01)

(56) References Cited

U.S. PATENT DOCUMENTS

2007/0212606 A1* 9/2007 Chang .......................... 429/221
2007/0292747 A1* 12/2007 Chiang et al. .................. 429/52
2008/0248375 A1* 10/2008 Cintra et al. ................... 429/94
2009/0145536 A1 6/2009 Chang
2010/0136433 A1* 6/2010 Kim et al. ................ 429/231.95
2011/0091772 A1* 4/2011 Mishima et al. .............. 429/221

FOREIGN PATENT DOCUMENTS

| KR | 10-2008-0035466 A | 4/2008 | | |
|---|---|---|---|---|
| KR | 10-2008-0077412 A | 8/2008 | | |
| TW | 200742147 | 11/2007 | | |
| WO | WO 2008/091707 | * | 7/2008 | ............. H01M 4/58 |
| WO | WO 2009/122686 | * | 10/2009 | ............. H01M 4/02 |

* cited by examiner

CATHODE MIX HAVING IMPROVED EFFICIENCY AND ENERGY DENSITY OF ELECTRODE

This application is a Continuation of copending PCT International Application No. PCT/KR2009/006082 filed on Oct. 21, 2009 which designated the United States, and on which priority is claimed under 35 U.S.C. §120. This application also claims priority under 35 U.S.C. §119(a) on Patent Application No. 10-2008-0103553 filed in the Republic of Korea on Oct. 22, 2008. The entire contents of each of the above documents are hereby incorporated by reference into the present application.

FIELD OF THE INVENTION

The present invention relates to a cathode mix with improved electrode efficiency and energy density. More specifically, the present invention relates to a cathode mix comprising, as a cathode active material, lithium iron phosphate ($LiFe(P_{1-x}O_4)$) wherein a molar fraction ($1-x$) of phosphorus (P) is in the range of 0.910 to 0.999 to allow operational efficiency of the cathode active material to be leveled to a lower operational efficiency of an anode active material and improve energy density of the cathode active material.

BACKGROUND OF THE INVENTION

Technological development and increased demand for mobile equipment have led to a rapid increase in the demand for secondary batteries as energy sources. Among these secondary batteries, lithium secondary batteries having high energy density and voltage, long life span and low self-discharge are commercially available and widely used.

The lithium secondary batteries generally use a carbon material as an anode active material. Also, the use of lithium metals, sulfur compounds, silicon compounds, tin compounds and the like as the anode active material have been considered. Meanwhile, the lithium secondary batteries generally use lithium cobalt composite oxide ($LiCoO_2$) as a cathode active material. Also, the use of lithium-manganese composite oxides such as $LiMnO_2$ having a layered crystal structure and $LiMn_2O_4$ having a spinel crystal structure and lithium nickel composite oxide ($LiNiO_2$) as the cathode active material has been considered.

$LiCoO_2$ is currently used owing to superior physical properties such as cycle life, but has disadvantages of low stability and high-cost due to use of cobalt, which suffers from natural resource limitations, and limitations of mass-use as a power source for electric automobiles. $LiNiO_2$ is unsuitable for practical application to mass-production at a reasonable cost due to many features associated with preparation methods thereof. Lithium manganese oxides such as $LiMnO_2$ and $LiMn_2O_4$ have a disadvantage of short cycle life.

In recent years, methods to use lithium transition metal phosphate as a cathode active material have been researched. Lithium transition metal phosphate is largely divided into $Li_xM_2(PO_4)_3$ having a NASICON structure and $LiMPO_4$ having an olivine structure, and is found to exhibit superior high-temperature stability, as compared to conventional $LiCoO_2$. To date, $Li_3V_2(PO_4)_3$ is the most widely known NASICON structure compound, and LiFePO4 and $Li(Mn,Fe)PO_4$ are the most widely known olivine structure compounds.

Among olivine structure compounds, $LiFePO_4$ has a high output voltage of 3.5 V and a high theoretical capacity of 170 mAh/g, as compared to lithium (Li), and exhibits superior high-temperature stability, as compared to cobalt (Co), and utilizes cheap Fe as an ingredient, thus being highly applicable as the cathode active material for lithium secondary batteries. However, such an olivine-type $LiFePO_4$ has an operational efficiency of about 100%, thus making it difficult to control with the operational efficiency of an anode.

In this regard, by imparting equivalent operational efficiency to a cathode and an anode in batteries, inefficient waste of the electrodes can be minimized. For example, in the case where an anode having efficiency of about 100% is used for a battery, the battery can exert 100% efficiency, while when a cathode having 100% efficiency and an anode having 90% efficiency are used for a battery, the battery can exert only 90% efficiency. As a result, 10% of the efficiency of the cathode is disadvantageously wasted.

For example, in the case of generally-used carbon-based anode active materials, about 10-20% irreversible capacity are generated upon initial charge/discharge including the first charge and its reversible capacity is only about 80 to 90%. Accordingly, when a material having an efficiency of 100% is used as a cathode active material, the electrode material is disadvantageously wasted in direct proportion to the irreversible capacity of about 10 to 20%. In addition, when an anode active material having relatively low efficiency is used, an amount of anode active material used should be increased, depending on a higher efficiency of a cathode, which disadvantageously entails an increase in manufacturing costs.

On the other hand, in order to impart 100% efficiency to a battery using a cathode having 100% efficiency, an anode having about 100% efficiency should be used. In this case, the selection range of an anode active material is disadvantageously narrowed.

However, to date, there is no technology suggesting a method for controlling efficiency of $LiFePO_4$ as a cathode active material.

In addition, there is an increasing need for a breakthrough that can considerably improve electrical conductivity of $LiFePO_4$ and solve $Li^+$ diffusion problems thereof via improvement in initial IR drop and $Li^+$ diffusion properties.

SUMMARY OF THE INVENTION

Therefore, the present invention has been made to solve the above problems and other technical problems that have yet to be resolved.

As a result of a variety of extensive and intensive studies and experiments to solve the problems as described above, the inventors of the present invention have discovered that control of molar fraction ($1-x$) of phosphorus (P) in high-efficiency lithium iron phosphate to the range of 0.910 to 0.999 enables leveling of efficiency of the cathode active material to a lower operational efficiency of an anode active material, minimization in waste of electrode efficiency and thus ultimate maximization of efficiency and capacity of electrodes and batteries, and that controlling Fe valence enables improvement in IR drop and rate properties, improvement in charge/discharge plateau potential and thus maximized increase in energy density. Based on this discovery, the present invention has been completed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Figure 1:
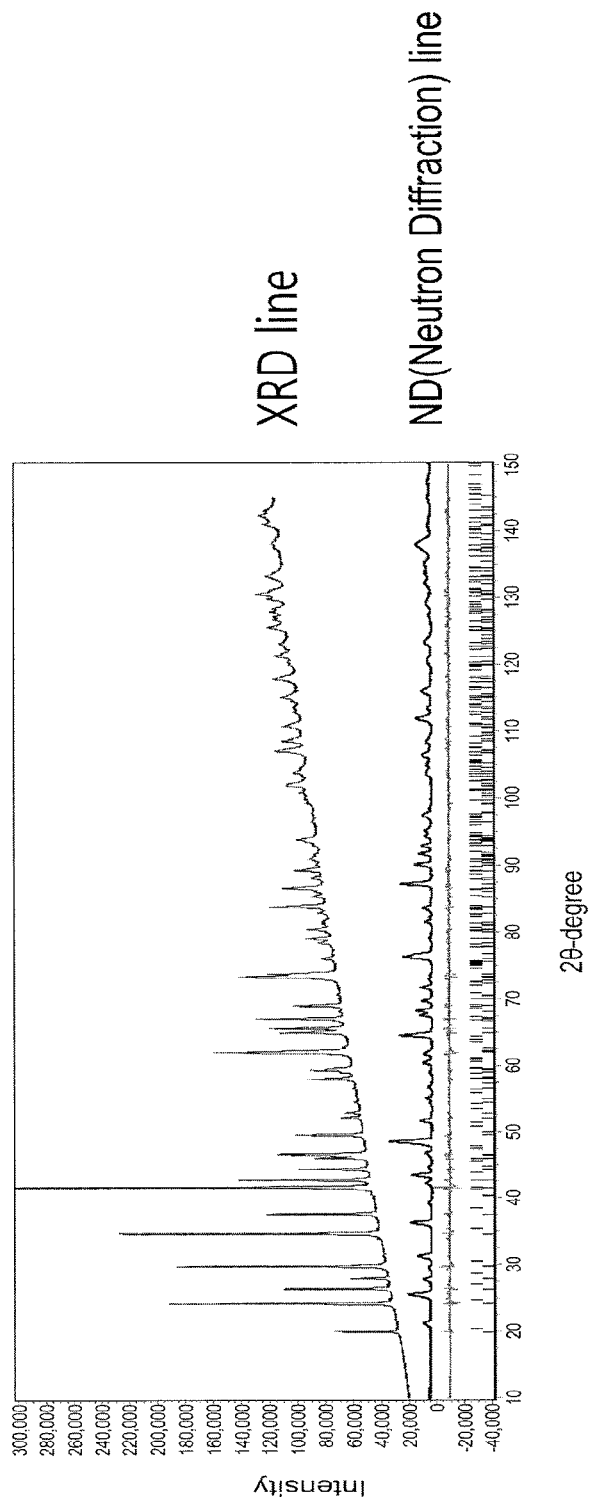
FIG. 1 is a graph showing results of XRD/ND refinement assay in Experimental Example 2.

In accordance with an aspect of the present invention, the above and other objects can be accomplished by the provision of a cathode mix for lithium secondary batteries, comprising a cathode active material having a composition represented by the following Formula I, $$LiFe(P_{1-x}O_4) \qquad (I)$$

wherein molar fraction (1−x) of phosphorus (P) is in the range of 0.910 to 0.999 to allow operational efficiency of the cathode active material to be leveled to a lower operational efficiency of an anode active material and improve energy density of the cathode active material.

As mentioned hereinbefore, $LiFePO_4$ has an operational efficiency of about 100%. Accordingly, when an anode active material having lower efficiency is used as an anode active material, electrode materials are required, in order to cause the anode active material to have reversible capacity, comparable to a cathode active material, thus disadvantageously entailing an increase in manufacturing costs.

In this regard, the inventors of the present invention discovered that initial operational efficiency can be relatively reduced by controlling molar fraction (1−x) of phosphorus (P) in the range of 0.910 to 0.999. In accordance with this discovery, although an anode active material having lower operational efficiency is used, operational efficiency of a cathode active material can be leveled to that of the anode active material.

Accordingly, the present invention enables minimization of electrode material waste and thus considerable decrease in manufacturing costs, and secures desired efficiency and capacity of batteries, thus being highly advantageous in view of manufacturing processes. In addition, the present invention solves problems associated with irreversible capacity of anode active materials and widens selection range of anode active material used in combination with cathode active material, when taking into consideration battery efficiency.

Furthermore, general $LiFePO_4$ contains only Fe with a valence of $2^+$, while $LiFeP_{(1-x)}O_4$ wherein molar fraction (1−x) of phosphorus (P) is in the range of 0.910 to 0.999 in accordance with the present invention has a decreased molar fraction of phosphorus (P) and thus contains both $Fe^{2+}$ and $Fe^{3+}$. When a metal present in the structure of an active material has a mixed valence (e.g. $Fe^{2+}/Fe^{3+}$), electrical conductivity and $Li^+$ diffusion-associated ionic conductivity are increased and overall rate properties are thus considerably improved, as compared to when the metal has a single valence.

The present inventors have discovered that the cathode active material of the present invention inhibits IR drop upon charge/discharge and enhances discharge profile, without causing any structural variation, and thus ultimately increases energy density of batteries.

As used herein, the term "an anode active material having lower operational efficiency" refers to a material having operational efficiency lower than that the compound of Formula I, the cathode active material, and includes all anode active materials having lower efficiency and anode active materials having decreased operational efficiency, as compared to cathode active materials due to irreversible capacity generated therein upon initial charge/discharge including the first charge, although they have theoretical capacity comparable to cathode active materials.

The anode active material has an operational efficiency lower than 100%, preferably, of 90 to 98%, more preferably, of 90 to 95%.

For example, such an anode active material is preferably a carbon-based material capable of exerting high discharge capacity.

Any carbon-based material may be used without particular limitation so long as it permits reversible intercalation/deintercalation of lithium ions. The carbon-based material may be a crystalline carbon-based compound, an amorphous carbon-based compound, or a combination thereof. A representative example of the crystalline carbon-based compound is graphite. The graphite-based crystalline carbons include potato- or mesocarbon microbead (MCMB)-shape artificial graphite, natural graphite surface-treated to obtain a flat edge, and the like. In addition, the amorphous carbon-based compound is a material comprising carbon atoms having an amorphous crystal structure and examples thereof include non-graphitizable carbon (hard carbon) prepared by subjecting phenol or furan resins to pyrolysis and graphitizable carbon (soft carbon) prepared by carbonizing coke, needle coke or pitch.

In a preferred embodiment, the carbon material may be natural or artificial graphite which has high capacity and high energy density owing to superior density and conductivity and thus exhibits superior output and rate properties. More preferably, the carbon material may be mesocarbon microbeads (MCMBs) which are optical anisotropic spherical particles prepared by heating coke, pitch or the like at about 400° C.

In addition, as examples of the anode active material in addition to the carbon materials that can be used in the present invention, mention may be made of $Li_yFe_2O_3$ (0≤y≤1), $Li_yWO_2$ (0≤y≤1), $Sn_xMe_{1-x}Me'_yO_z$ (Me: Mn, Fe, Pb, Ge; Me': Al, B, P, Si, Group I, II and III elements of the Periodic Table, halogens; 0≤x≤1; 1≤y≤3; 1≤z≤8) metal composite oxides; lithium metals; lithium alloys; silicon-based alloys; tin-based alloys; and metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$ and the like.

In the present invention, the molar fraction of phosphorus (P) is in the range of 0.910 to 0.999, preferably, of 0.955 to 0.995. When the molar fraction of the phosphorus (P) is 1, operational efficiency is close to 100%, and when the molar fraction is less than 0.91, the crystalline structure of $LiFe_{(1-x)}O_4$ is deformed, disadvantageously making it difficult to maintain structural stability.

The operational efficiency of the cathode active material is substantially proportional to the molar fraction, of phosphorus (P). Accordingly, the cathode active material wherein the molar fraction of phosphorus (P) is 0.910 to 0.999 according to the present invention can be leveled to operational efficiency of 90 to 99.9%, preferably 95 to 99%.

There are several methods for adjusting the molar fraction of phosphorus (P) to 0.910 to 0.999. For example, an amount of phosphorus (P) precursor added is decreased in the process of preparing $LiFePO_4$ or is controlled by pH regulation in the process of synthesis. In accordance with the former method, when the amount of phosphorus (P) precursor added is decreased during a short-time reaction, a reaction product is produced in the presence of a slight deficiency of phosphorus (P) and the desired range of molar fraction can thus be obtained. In accordance with the latter method, a portion of phosphorus (P) is eluted from a reaction product under a slightly decreased pH, thus securing the desired range of molar fraction.

In addition to the cathode active material, the cathode mix may optionally comprise a conductive material, a binder, a filler and the like.

The conductive material is commonly added in an amount of 1 to 50% by weight, based on the total weight of the mixture including the cathode active material. Any conductive material may be used without particular limitation so long as it has suitable conductivity without causing adverse chemical changes in the fabricated secondary battery. As examples of the conductive materials that can be used in the present invention, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component which helps binding of an active material to a conductive material and current collector. The binder is commonly added in an amount of 1 to 50% by weight, based on the total weight of the compound including the anode active material. Examples of the binder include polyvinylidene, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene propylene diene terpolymer (EPDM), sulfonated EPDM, styrene butadiene rubber, fluoro rubber and various copolymers.

The filler is a component used to inhibit expansion of the anode. There is no particular limit to the filler, so long as it does not cause adverse chemical changes in the fabricated battery and is a fibrous material. As examples of the filler, there may be used olefin polymers such as polyethylene and polypropylene; and fibrous materials such as glass fibers and carbon fibers.

Also, the present invention provides a cathode for secondary batteries wherein the cathode mix is applied to a current collector.

The cathode for secondary batteries may be prepared by applying a slurry obtained by mixing the cathode mix with a solvent such as NMP to a cathode current collector, followed by drying and press-rolling.

The cathode current collector is generally fabricated to have a thickness of 3 to 500 μm. There is no particular limit to the cathode current collector, so long as it has suitable conductivity without causing adverse chemical changes in the fabricated battery. As examples of the cathode current collector, mention may be made of stainless steel, aluminum, nickel, titanium, sintered carbon, and aluminum or stainless steel surface-treated with carbon, nickel, titanium or silver. If necessary, these current collectors may also be processed to form fine irregularities on the surface thereof so as to enhance adhesive strength to the cathode active materials. In addition, the current collectors may be used in various forms including films, sheets, foils, nets, porous structures, foams and non-woven fabrics.

Also, the present invention provides a lithium secondary battery comprising the cathode, the anode, a separator, and a lithium salt-containing non-aqueous electrolyte. The lithium secondary battery utilizes, as a cathode active material, LiFe$(P_{1-x}O_4)$ wherein a molar fraction $(1-x)$ of phosphorus (P) is in the range of 0.910 to 0.999, thereby allowing operational efficiency of the cathode active material to be leveled to operational efficiency of an anode active material, and advantageously realizing maximization of battery efficiency and exhibiting superior rate properties and improved energy density due to high electrical conductivity and ionic conductivity.

For example, the anode is prepared by applying an anode mix comprising an anode active material to an anode current collector, followed by drying. The anode mix may comprise the afore-mentioned ingredients, i.e., the conductive material, the binder and the filler.

The anode current collector is generally fabricated to have a thickness of 3 to 500 μm. There is no particular limit to the anode current collector, so long as it has suitable conductivity without causing adverse chemical changes in the fabricated battery. As examples of the anode current collector, mention may be made of copper, stainless steel, aluminum, nickel, titanium, sintered carbon, and copper or stainless steel surface-treated with carbon, nickel, titanium or silver, and aluminum-cadmium alloys. Similar to the cathode current collector, if necessary, these current collectors may also be processed to form fine irregularities on the surface thereof so as to enhance adhesive strength to the anode active materials. In addition, the current collectors may be used in various forms including films, sheets, foils, nets, porous structures, foams and non-woven fabrics.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and a lithium salt. As the non-aqueous electrolyte, a non-aqueous electrolytic solution, solid electrolyte and inorganic solid electrolyte may be utilized.

As the non-aqueous electrolytic solution that can be used in the present invention, for example, mention may be made of non-protic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

EXAMPLES

Now, the present invention will be described in more detail with reference to the following examples. These examples are provided only for illustrating the present invention and should not be construed as limiting the scope and spirit of the present invention.

Preparation Examples 1-4

Cathode active materials ($LiFeP_{1-x}O_4$) wherein the content of phosphorus (P) is 0.94 (Preparation Example 1), 0.96 (Preparation Example 2), 0.97 (Preparation Example 3) and 0.985 (Preparation Example 4) were prepared by a hydrothermal process, well-known as a $LiFePO_4$ preparation method, in accordance with the following process. A more detailed description will be given below.

A solution of lithium hydroxide ($LiOH$—$H_2O$) and iron sulfate ($FeSO_4$-$6H_2O$) as Li and Fe sources in distilled water and phosphoric acid ($H_3PO_4$) as a P source were placed in a reaction chamber. The molar ranges of these materials placed in the reaction chamber were as follows: $FeSO_4$: 0.5 mol, $LiOH$—$H_2O$: 0.5 mol-1.5 mol, $H_3PO_4$: 0.5 mol-0.6 mol.

The reaction was carried out in the reaction chamber at 380° C. for 15 sec. The reaction pressure was maintained at 270 bar using a pressure controller. When an excess of Li and P compounds are added in hydrothermal reactions generally having a slow reaction rate, impurities may be generally apt to be generated at high temperature under high pressure. Accordingly, in this example, generation of impurities was inhibited by maintaining a rapid reaction rate. The pH of the solution was controlled to 6 by adding a small amount of aqueous ammonia. The $LiFePO_4$ particles thus prepared were washed and then dried under vacuum at 90° C. The dried particles were carbon-coated with sucrose and subjected to thermal treatment at 700° C. for 10 hours.

Example 1

90% by weight of $LiFeP_{0.94}O_4$ prepared in Preparation Example 1, as the cathode active material, 5% by weight of Super-P as a conductive material and 5% by weight of PVdF as a binder were added to NMP (N-methyl-2-pyrrolidone) to prepare a cathode mixture slurry. The cathode mixture slurry was coated on one surface of an aluminum foil, followed by drying and pressing, to fabricate a cathode.

95% by weight of carbon as an anode active material, 1.5% by weight of Super-P as a conductive material and 3.5% by weight of PVdF as a binder were added to NMP as a solvent, to prepare an anode mix slurry. The anode mix slurry was coated on one surface of an aluminum foil, followed by drying and pressing, to fabricate an anode.

An electrode assembly was fabricated by laminating the cathode and the anode using Cellguard™ as a separator and a lithium non-aqueous electrolyte containing 1M $LiPF_6$ in cyclic and linear carbonate mix solvent was added to the electrode assembly to fabricate a battery.

Example 2

A battery was fabricated in the same manner as in Example 1 except that $LiFeP_{0.96}O_4$ prepared in Preparation Example 2 was used as the cathode active material.

Example 3

A battery was fabricated in the same manner as in Example 1 except that $LiFeP_{0.97}O_4$ prepared in Preparation Example 3 was used as the cathode active material.

Example 4

A battery was fabricated in the same manner as in Example 1 except that $LiFeP_{0.985}O_4$ prepared in Preparation Example 4 was used as the cathode active material.

Comparative Example 1

A battery was fabricated in the same manner as in Example 1 except that $LiFePO_4$ was used as the cathode active material.

Experimental Example 1

Operational efficiency was measured for the batteries prepared in Example 1 and Comparative Example 1 and the results thus obtained are shown in the following Table 1.

TABLE 1

|  | Li:Fe:P | Efficiency |
|---|---|---|
| Ex. 1 | 1:1:0.94 | 95.8% |
| Ex. 2 | 1:1:0.96 | 96.8% |
| Ex. 3 | 1:1:0.97 | 97.6% |
| Ex. 4 | 1:1:0.985 | 99.6% |
| Comp. Ex. 1 | 1:1:1 | 100% |

As can be seen from Table 1 below, charge/discharge efficiency in each cycle can be adjusted to a level lower than 100% by controlling the amount of P present in $LiFePO_4$ to a level lower than 1.

Experimental Example 2

Figure 2:
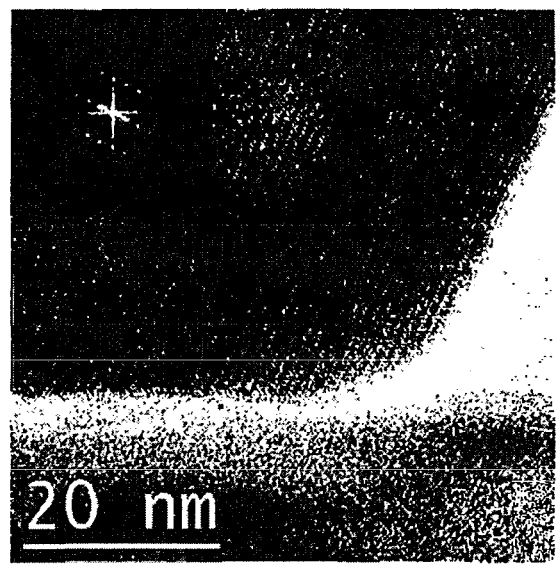
FIG. 2 is an image showing results of HRTEM structural analysis in Experimental Example 2.

The cathode active material obtained in Preparation Example 4 was subjected to XRD and the batteries prepared in Example 4 and Comparative Example 1 were subjected to ND (neutron) refinement assay, HRTEM structural analysis, and Fe valence analysis using Mossbauer effects. The results thus obtained are shown in FIGS. 1 to 3.

As can be seen from the figures, the cathode active material in accordance with the present invention underwent no structural variation and maintained its single crystal olivine-structure containing no impurities, although the molar fraction of P is lower than 1.

Figure 4:
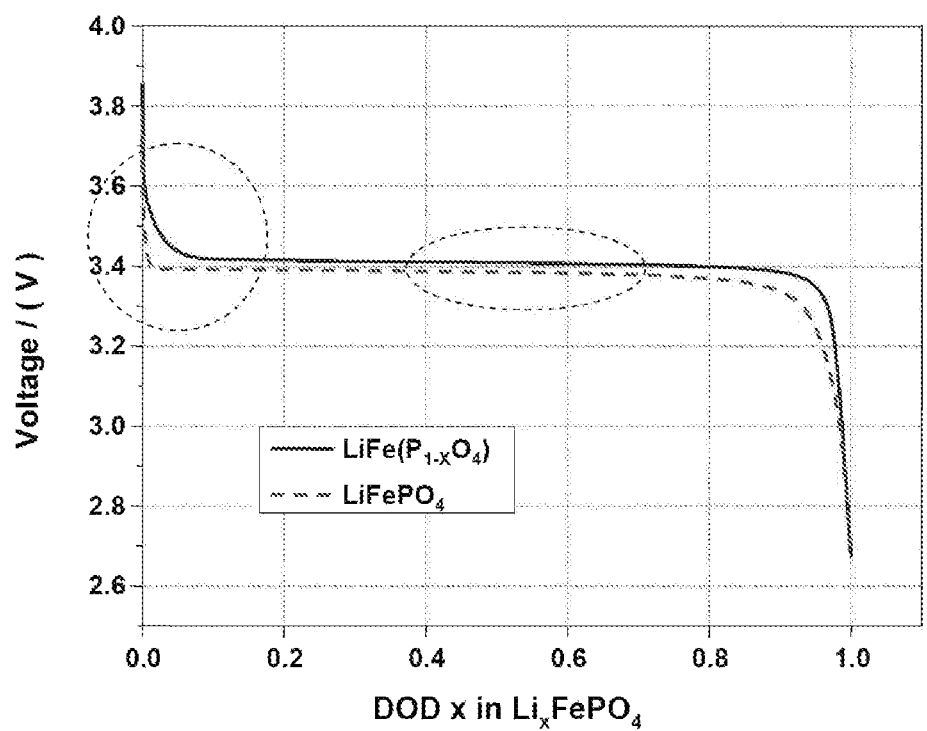
FIG. 4 is a graph showing discharge results in Experimental Example 2.

In addition, variation in voltage upon 0.5 C discharge was measured and the results thus obtained are shown in FIG. 4. As can be seen from FIG. 4, the battery (LiFe(P$_{(1-x)}$)O$_4$); x=0.015) of the present invention underwent lower initial IR drop and expressed discharge profiles at a higher potential, as compared to the battery (LiFe(PO$_4$) of Comparative Example 1. This indicates considerable improvement in ionic conductivity and electrical conductivity and thus considerable improvement in energy density of batteries.

Figure 3:
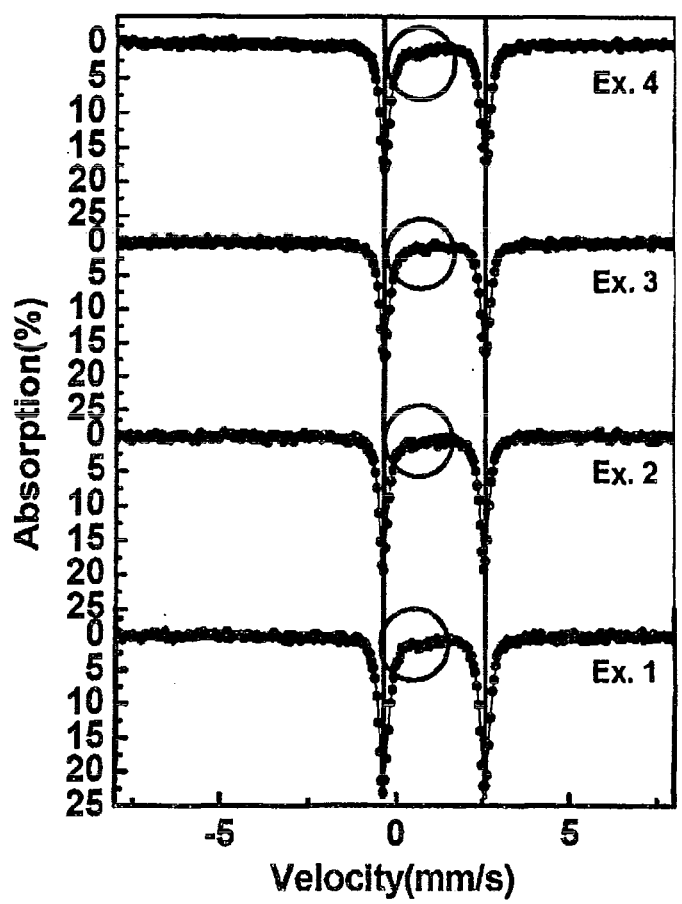
FIG. 3 is a graph showing results of Fe valence analysis using Mossbauer effects in Experimental Example 2.

This behavior is considered because Fe$^{2+}$ and Fe$^{3+}$ coexist in the cathode active material, when taking into consideration that a dominant amount of Fe$^{2+}$ and a small amount of Fe$^{3+}$ were measured in Fe valence analysis using Mossbauer effects, as shown in FIG. 3. In this regard, as apparent from FIGS. 1 and 2, containing no impurity was observed in XRD/ND refinement and HRTEM, which indicates coexistence of Fe$^{2+/3+}$ in the olivine structure.

INDUSTRIAL APPLICABILITY

As apparent from the above description, in accordance with the present invention, molar fraction (1–x) of phosphorus (P) in LiFePO$_4$, the high-efficiency cathode active material, is controlled to the range of 0.910 to 0.999, thereby allowing operational efficiency of the cathode active material to be leveled to operational efficiency of an anode active material, maximizing usable efficiency of batteries, minimizing electrode waste and thus reducing manufacturing costs of batteries. In addition, controlling a Fe valence leads to improvement in IR drop and rate properties as well as charge/discharge plateau potential, thus realizing fabrication of superior batteries with an increased energy density.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cathode mix for lithium secondary batteries, comprising a cathode active material being entirely homogenous and having a composition represented by the following Formula I:

$$\text{LiFe(P}_{1-X}\text{O}_4) \qquad (I)$$

wherein a molar fraction (1–x) of phosphorus (P) is in the range of 0.910 to 0.999, and wherein Fe is present as Fe$^{2+}$ and Fe$^{3+}$.

2. The cathode mix according to claim 1, wherein the anode active material has operational efficiency of 90 to 98%.

3. The cathode mix according to claim 2, wherein the anode active material is a carbon-based material.

4. The cathode mix according to claim 1, wherein the molar fraction (1–x) of phosphorus (P) is in the range of 0.955 to 0.995.

5. A lithium secondary battery comprising an electrode to which the cathode mix according to claim 1 is applied on a current collector.

6. A lithium secondary battery comprising the cathode according to claim 5.

7. A lithium secondary battery comprising an electrode to which the cathode mix according to claim 2 is applied on a current collector.

8. A lithium secondary battery comprising an electrode to which the cathode mix according to claim 3 is applied on a current collector.

9. A lithium secondary battery comprising an electrode to which the cathode mix according to claim 4 is applied on a current collector.

* * * * *